(12) United States Patent
Ghosh

(10) Patent No.: US 9,019,962 B1
(45) Date of Patent: Apr. 28, 2015

(54) TUNNELING FROM A PROVIDER EDGE ROUTING DEVICE TO A REMOTE CUSTOMER EDGE NETWORK DEVICE

(75) Inventor: Kaushik Ghosh, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 895 days.

(21) Appl. No.: 12/630,616

(22) Filed: Dec. 3, 2009

(51) Int. Cl.
*H04L 12/28* (2006.01)
*H04L 12/56* (2006.01)
*H04L 12/931* (2013.01)
*H04L 12/701* (2013.01)
*H04L 12/713* (2013.01)

(52) U.S. Cl.
CPC ............. *H04L 49/70* (2013.01); *H04L 45/00* (2013.01); *H04L 45/586* (2013.01)

(58) Field of Classification Search
CPC ........ H04L 45/00; H04L 45/586; H04L 49/70
See application file for complete search history.

(56) References Cited

U.S. PATENT DOCUMENTS

| | | | |
|---|---|---|---|
| 2009/0092137 A1* | 4/2009 | Haigh et al. | 370/392 |
| 2009/0092140 A1* | 4/2009 | Gibbons et al. | 370/395.31 |
| 2010/0027549 A1* | 2/2010 | Satterlee et al. | 370/395.31 |
| 2010/0309920 A1* | 12/2010 | Rosenberg | 370/395.53 |
| 2013/0060940 A1* | 3/2013 | Koponen et al. | 709/225 |
| 2013/0287026 A1* | 10/2013 | Davie | 370/392 |

OTHER PUBLICATIONS

Rosen et al., "BGP/MPLS IP Virtual Private Networks (VPNs)," Network Working Group, RFC 4364, Feb. 2006, 44 pp.
Andersson et al., "Provider Provisioned Virtual Private Network (VPN) Terminology," Network Working Group, RFC 4026, Mar. 2005, 18 pp.
Cisco VPN Solutions Center: MPLS Solution User Guide, Chapter 1: "Introduction to Cisco MPLS VPN Technology," downloaded from the Internet on Nov. 2, 2009, 18 pp.

* cited by examiner

*Primary Examiner* — Hassan Phillips
*Assistant Examiner* — Lonnie Sweet
(74) *Attorney, Agent, or Firm* — Shumaker & Sieffert, P.A.

(57) ABSTRACT

Selection of proper virtual routing and forwarding (VRF) tables is based on a logical interface that is not associated with a physical interface. The selected VRF table is used to perform an output interface lookup for outgoing packets. In one example, a router includes a plurality of network interfaces, and a processing unit configured to select a logical interface not associated with any of the plurality of network interfaces based on an association with a received packet of a virtual private network, select one of a plurality of VRF tables in which to perform an output interface lookup for the packet that corresponds to the selected logical interface, and determine one of the plurality of network interfaces from the one of the plurality of VRF tables based on a destination of the packet, wherein the determined one of the plurality of network interfaces is configured to forward the packet.

28 Claims, 5 Drawing Sheets

TUNNELING FROM A PROVIDER EDGE ROUTING DEVICE TO A REMOTE CUSTOMER EDGE NETWORK DEVICE

TECHNICAL FIELD

This disclosure relates to computer networks and, more particularly, to engineering traffic flows within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

A private network may include a number of devices, such as computers, owned or administered by a single enterprise. These devices may be grouped into a number of site networks, which in turn may be geographically distributed over a wide area. Each site network may include one or more local area networks (LANs). With the advent of Virtual Private Network (VPN) technology, enterprises can now securely share data between site networks over a public network, such as the Internet. In a typically implementation, one or more "network tunnels" are engineered through the intermediate network to transport data and other network communications between the geographically distributed sites.

One form of a VPN is generally referred to as "MPLS VPN" in which Multi-Protocol Label Switching (MPLS) tunnels are used as a transport mechanism. MPLS is a mechanism used to engineer traffic patterns within Internet Protocol (IP) networks. By utilizing MPLS, a source device can request a path through a network to a destination device, i.e., a Label Switched Path (LSP), to carry MPLS packets from the source device to a destination device. Each router along an LSP allocates a label and propagates the label to the closest upstream router along the path for use in forwarding MPLS packets along the path. Routers along the path cooperatively perform MPLS operations to forward the MPLS packets along the established path.

An MPLS VPN combines the tunneling processes of MPLS with virtual routing and forwarding (VRF) and features of border gateway protocol (BGP) to create a VPN. When a VPN is established within a network, devices for the VPN each include VPN-specific VRF tables. Greater details regarding VPNs, specifically VPNs implemented using BGP and MPLS are discussed in E. Rosen and Y. Rekhter, "BGP/MPLS IP Virtual Private Networks (VPNs)," RFC 4364, February 2006, available at tools.ietf.org/html/rfc4364, and L. Andersson and T. Madsen, "Provider Provisioned Virtual Private Network (VPN) Terminology," RFC 4026, March 2005, available at tools.ietf.org/html/rfc4026, the entire contents of each of which are incorporated by reference in their respective entireties.

Other forms of tunneling may be used instead of or in conjunction with MPLS. For example, another commonly used tunneling protocol is the Generic Routing Encapsulation (GRE) protocol which is typically used to encapsulate packets within Internet Protocol (IP) tunnels, thereby creating a virtual point-to-point link between devices, such as routers.

Routers involved in VPN-communications for an enterprise (e.g., provider edge (PE) routers or routers at the edge of a service provider network) maintain distinct virtual routing and forwarding VRF tables for each customer VPN, thereby providing a degree of logical isolation of routing and forwarding information for each different VPN. This technique works well when tunneling between devices with that are logically associated with the same routing and forwarding instance within a give router, such as when tunneling between two PE routers of the intermediate network or between a PE router of a service provider network and a local customer edge (CE) router coupled to that network. However, logical isolation of VRFs within a router may present significant challenges for the router when attempting to establish a tunnel with another router associated with specific instance of the VRF, such as a CE router of a customer VPN provided by a remote service provider network.

SUMMARY

In general, this disclosure describes techniques for routing packets along a network tunnel from a provider edge (PE) router of a service provider network to a customer edge (CE) router attached to a remote PE router in a different part of an MPLS (multi-protocol label switched) cloud. That is, these techniques enable the formation of a network tunnel that begins at a local PE router and extends beyond a service provider's network to a remote customer edge network device, possibly through intermediate provider routers, as PE routers can be connected back to back. Such a network tunnel can be employed to tunnel through an intermediate device of the service provider network that does not support a particular service, e.g., multicast, that is requested by the customer at the remote customer edge.

To enable a network tunnel between a local PE router and a remote CE router through a remote PE router, the local PE router ensures that it performs both tunnel destination route lookups and tunnel output interface lookups with respect to an appropriate virtual routing and forwarding (VRF) table corresponding to the VPN of the tunnel. In this manner, when a packet is received from a local CE device, the local PE router that receives the packet may lookup the packet's destination in a VRF and the output interface in the VRF, rather than in the default routing instance, despite the fact that the output interface for the tunnel will be core-facing, that is, connected to a device of the service provider network.

In one example, a method includes selecting, with a provider edge routing device, a logical interface that is not associated with a physical output interface based on an association with a received packet of a virtual private network, selecting one of a plurality of virtual routing and forwarding (VRF) tables in which to perform an output interface lookup for the packet that corresponds to the selected logical interface, determining an output interface from the one of the plurality of VRF tables based on a destination of the packet, and forwarding the packet via the determined output interface.

In another example, a routing device includes a plurality of physical network interfaces, a processing unit comprising a plurality of virtual routing and forwarding (VRF) tables that store forwarding information for different corresponding virtual private networks (VPNs), and a plurality of logical interfaces, each of the logical interfaces corresponding to a different one of the plurality of VRF tables, wherein each of the logical interfaces is a default logical interface for the corresponding VRF table and is not associated with any of the physical network interfaces. To perform an output interface lookup for a packet, the processing unit is configured to select one of the plurality of VRF tables based on the logical interfaces associated with the VRF tables. In accordance with the output interface lookup, the processing unit outputs the packet to one of the physical network interfaces that provides an ingress to a network tunnel.

In another example, a system includes a network device of a virtual private network, and a provider edge routing device. The provider edge routing device includes a plurality of physical network interfaces, a processing unit comprising a plurality of virtual routing and forwarding (VRF) tables that store forwarding information for different corresponding virtual private networks (VPNs), including the virtual private network for the network device, and a plurality of logical interfaces, each of the logical interfaces corresponding to a different one of the plurality of VRF tables, wherein each of the logical interfaces is a default logical interface for the corresponding VRF table and is not associated with any of the physical network interfaces. To perform an output interface lookup for a packet, the processing unit is configured to select one of the plurality of VRF tables based on the logical interfaces associated with the VRF tables. In accordance with the output interface lookup, the processing unit outputs the packet to one of the physical network interfaces that provides an ingress to a network tunnel.

In another example, a computer-readable medium, such as a computer-readable storage medium, contains, e.g., is encoded with, instructions that cause a programmable processor to select a logical interface that is not associated with a physical output interface based on an association with a received packet of a virtual private network, wherein the logical interface is a default logical interface for a routing instance of the provider edge routing device and is not associated with a physical output interface of the provider edge routing device, select one of a plurality of virtual routing and forwarding (VRF) tables in which to perform an output interface lookup for the packet that corresponds to the selected logical interface, determine an output interface from the one of the plurality of VRF tables based on a destination of the packet, and forward the packet via the determined output interface.

The techniques of this disclosure may provide one or more advantages. For example, the techniques may enable services to be provided by a service provider to a customer even when intermediate devices within the service provider's network do not support the service. The devices in the service provider network that do not support the service can be tunneled through to reach devices that do in fact provide the service, e.g., a remote customer edge device. For example, one or more devices that were previously deployed by the service provider within the service provider network may not support multicast, while other service provider devices do support multicast. In this example, the devices that do not support multicast can be tunneled through to reach those devices that support multicast. The techniques may also enable tunneling between two VPNs without route leaking or leaking of table next hops to continue lookups.

The details of one or more examples are set forth in the accompanying drawings and the description below. Other features, objects, and advantages will be apparent from the description and drawings, and from the claims.

DETAILED DESCRIPTION

Figure 1:
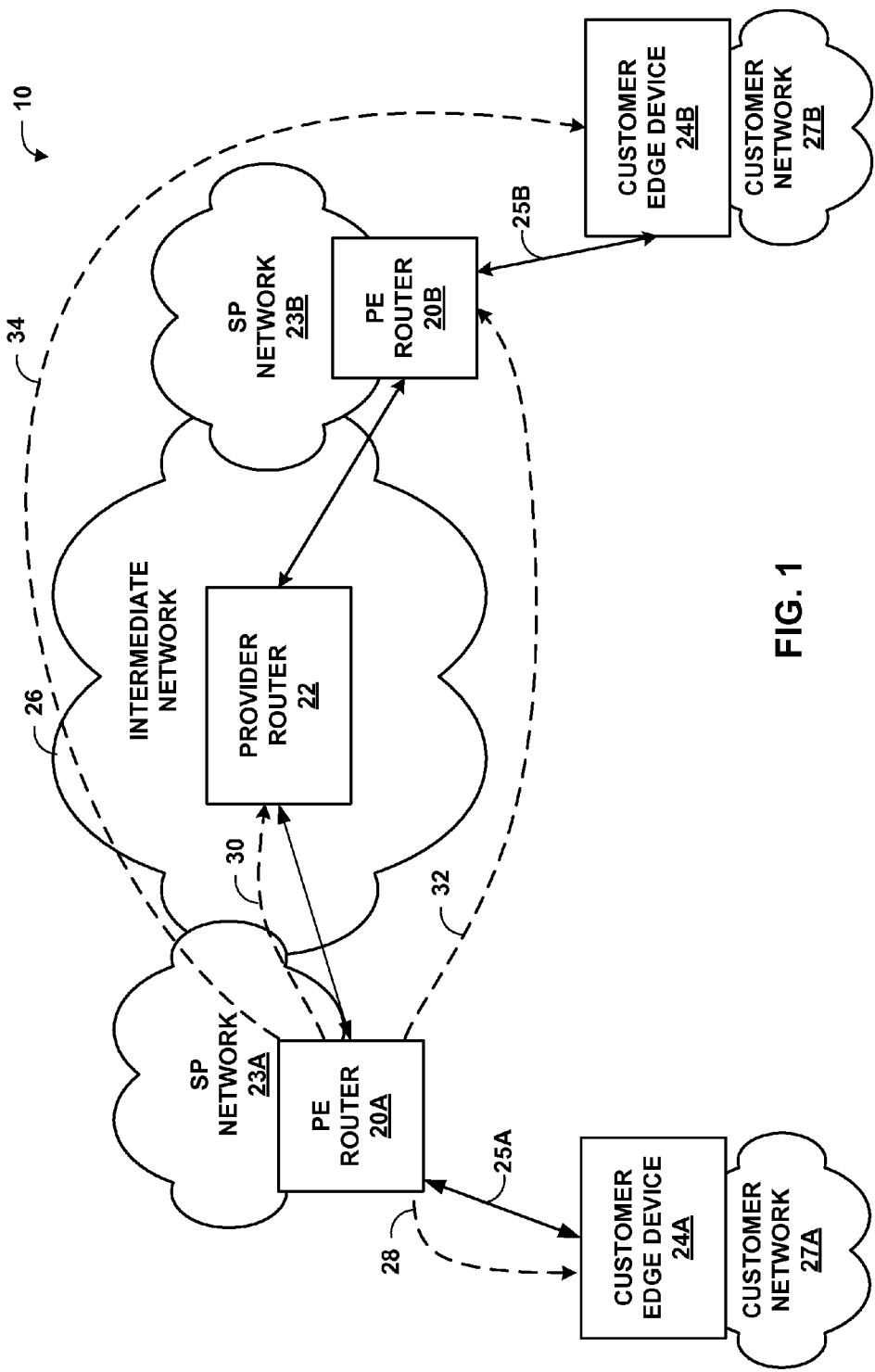
FIG. 1 is a block diagram illustrating an example system including a provider edge (PE) router that establishes a network tunnel between itself and a remote customer edge (CE) network device.

FIG. 1 is a block diagram illustrating an example system 10 including provider edge (PE) router 20A that establishes tunnel 34 between itself and remote customer edge (CE) network device 24B. That is, as shown in the example of FIG. 1, PE router 20A is positioned within service provider network 23A, while CE device 24B is positioned within a different service provider network 23B geographically remote from PE router 20. In this example, PE router 20A communicates with customer edge device 24A via link 25A to provide customer network 27B access through intermediate network 26, which may be a collection of backbone and other service provider networks. Similarly, PE router 20B communicates with customer edge device 24B via link 25B to provide customer network 27B access through intermediate network 26, where customer networks 27A, 27B may, for example, be geographically separate networks associated with the same enterprise.

Each of PE routers 20 may exchange routing information with CE devices 24 to which they are coupled in order to maintain an accurate representation of the topology of network environment 10 and the respective customer networks 27. Customer networks 27 may include one or more computing devices (not shown), such as personal computers, laptop computers, handheld computers, workstations, servers, switches, printers, customer data centers or other devices. The configuration of network environment 10 illustrated in FIG. 1 is merely exemplary. For example, each of PE routers 20 may be coupled to any number of customer networks. Nonetheless, for ease of description, only customer networks 27A, 27B are illustrated in FIG. 1. CE device 24B is considered "remote" in the example of FIG. 1, relative to PE router 20A, because CE device 24B utilizes a different, geographically separate service provider network 23B for access through intermediate network 26 via a different provider edge router, i.e., PE router 20B in this example.

Although geographically separate, service provider networks 23 may be operated by the same service provider or by different service providers. Further, CE device 24A is referred to as being "local" to PE router 20A because PE router 20A is located within the service provider network (SP network 23A in this case) that provides CE device 24A and customer network 27A with direct access through intermediate network 26 so that traffic exchanged between the customer network and the intermediate network flows directly through PE router 20A. Similarly, CE device 24B is considered remote with respect to PE router 20A. Provider router 22 is an intermediate provider router located within a core of intermediate network 26 and not within an access network. In some examples, PE router 20A is connected directly to PE router 20B, without an intermediate provider router such as provider router 22.

Typically, one or more service providers manage network devices in service provider networks 23, e.g., PE devices 20A and 20B, and may manage provider router 22 within intermediate network 26 as well. Intermediate network 26 may be a dedicated network provided by the service provider, or may be a large-scale network infrastructure, e.g., the Internet. Service provider networks 23 provide computing devices within customer networks 27 access through intermediate network 26 and provide other services including virtual private network (VPN) services. Other examples of services that PE routers 20 may provide include, for example, Voice over IP (VOIP), access for Asynchronous Transfer Mode (ATM) or frame relay communications, Internet protocol (IP) data services, and multimedia distribution services, such as video streaming. In general, CE devices 24A, 24B may be managed by respective different customer networks, although in some examples CE devices 24A and 24B are managed by the same customer network.

The techniques of this disclosure are directed to tunneling packets from a PE routing device to a remote CE network device using a single tunnel that spans intermediate network 26 and SP network 23B. In the example of FIG. 1, PE router 20A establishes tunnel 34 with remote CE device 24B through provider router 22 and PE router 20B, where PE router 20A and CE device 24B form the end points of the tunnel. PE router 20A may also establish tunnel 28 with local CE device 24A, tunnel 30 with provider router 22, and tunnel 32 with PE router 20B. In other examples, PE router 20A need not necessarily form tunnels 28, 30, and/or 32 to perform the techniques of this disclosure. That is, tunnels 28, 30, and 32 are optional and not necessary in order to perform the techniques of this disclosure. By using the techniques of this disclosure, PE router 20A establishes tunnel 34 with CE device 24B through intermediate network 26 and SP network 23B even though CE device 24B is remote to PE router 20A. Moreover, PE router 20A established tunnel 34 and properly forwards packets through the tunnels even though PE router 20A may maintain different a default routing table for core-facing interfaces associated with intermediate network 26 as well as distinct and logically isolated VRFs for customer VPNs. That is, as discussed herein, PE router 20A establishes tunnel 34 and properly forward packets to and from the tunnel even though routing information associated with routes through intermediate network 26 (a first portion of tunnel 34) and routing information for routes through service provider network 24A to customer edge device 24B (a second portion of tunnel 34) may be logically insolated in the routing and forwarding planes of PE router 20A.

For example, PE router 20A may maintain a large routing table to generally be used as a default routing table for packets to be sent to core-facing network interfaces associated with intermediate network 26, including packets associated with network tunnels 30 and 32 that terminate within the intermediate network. In addition, PE router 20A maintains a logically isolated VRF table to separately store routing and forwarding information to be used when forwarding packets associated with the VPN, such as packets to be sent to customer-facing network interfaces to customer edge device 24A of customer networks 27A, such as packets to be sent via tunnel 28. Each routing table (e.g., the default routing table and the VRF) may correspond to a distinct routing instance (i.e., a different software instantiation of a routing protocol daemon that maintains its own routing topology information and generates its own forwarding information to be applied in the forwarding plane of PE router 20A). That is, PE router 20A generally maintains a separate forwarding environment and a separate forwarding table (i.e., a separate VRF) for each VPN, as well as a default routing table for a default routing instance.

As discussed in greater detail below with respect to FIG. 2, PE router 20A applies the techniques described herein to correctly select and apply the VRF associated with the customer VPN for packets accepted into tunnel 34. That is, even though the packets entering tunnel 34 at PE router 20A are destined for a core-facing network interface, PE router 20A nevertheless does not apply the default routing table normally associated with intermediate network 26 but instead applies the techniques described herein to correctly select the VRF associated with the customer VPN. This allows for proper forwarding and routing of the packets since the egress of tunnel 34 (customer edge device 24B) is positioned remotely behind provider edge router 20B and, therefore, information related to the destination of the network tunnel may not be found within the default routing table associated with intermediate network 26. In other words, the techniques allow for forwarding information for the egress endpoint of a core-facing tunnel to be located within the VRF. PE router 20A includes two types of output interfaces: customer-facing output interfaces and core-facing output interfaces. Customer-facing output interfaces connect to devices beyond the "edge" of intermediate network 26, e.g., customer edge device 24A. Core-facing output interfaces are physical or logical network interfaces of PE router 20A that connect to devices within the "core" of intermediate network 26, e.g., provider router 22. When PE router 20A receives a packet associated with tunnel 30 or tunnel 32, PE router performs a lookup in a default routing table, which maps addresses of devices within intermediate network 26 to core-facing output interfaces. When PE router 20A receives a packet destined for tunnel 28, PE router 20A performs a lookup in a VRF table associated with the VPN services provided to customer networks 27, where the VRF table maps labels corresponding to associated tunnels to customer-facing output interfaces.

PE router 20A forwards packets along tunnel 34 according to the techniques of this disclosure. With respect to the example of tunnel 34 in FIG. 1, PE router 20A is the tunnel ingress, while CE device 24B is the tunnel egress. In the example of FIG. 1, tunnel 34 begins at PE router 20A and flows through provider router 22 and PE router 20B and optionally other devices of intermediate network 26, through service provider network 23B and finally ends with CE router 20B. In order for PE router 20A to admit a packet into tunnel 34, PE router 20A outputs the tunneled packet via a core-facing output interface. However, the default routing table, which maps destination addresses of devices internal to intermediate network 26 to next hops and ultimately to core-facing output interfaces, does not recognize keying information (e.g., labels) associated with remote devices, e.g., CE device 24B. In accordance with the techniques of this disclosure, PE router 20A is configured with a VRF table for VPN services for customer networks 27 that includes a tunneling interface and forwarding information (e.g., VPN label information) associated with tunnel 34 to reach CE device 24B, where the VRF maps a VPN label to a correct one of the core-facing output interfaces of PE router 20A. In this manner, router 20A is configured to tunnel packets to a remote CE device, e.g., remote CE device 24B.

As the ingress, PE router 20A encapsulates packets intended to be tunneled across tunnel 34 to CE router 20B with the label(s) corresponding to tunnel 34, while CE router 20B decapsulates packets of tunnel 34 and forwards the decapsulated packets to their ultimate destinations. In one example, PE router 20A encapsulates packets for tunnel 34 using two labels, an outer label and an inner label. The outer label (e.g., a generic routing encapsulation (GRE) label) represents a segment of tunnel 34 maintained by devices of intermediate network 26 (PE devices 20A, 20B, and provider router 22, in the example of FIG. 1), while the inner label comprises a VPN-specific label, used by PE router 20B to forward the packet to the tunnel egress (remote CE device 24B, in the example of FIG. 1). PE router 20B removes the outer label from a packet of tunnel 34 and forwards the packet comprising only the inner label to CE device 24B. CE device 24B ultimately decapsulates the inner labels from packets of tunnel 34 and forwards the packets toward their respective destinations.

For example, PE router 20A may initially receive a packet from a CE device, e.g., CE device 24A, to be admitted to tunnel 34. PE router 20A performs a lookup on the received packet to determine whether any or all of the services provided by PE router 20A are to be applied to the packet. PE router 20A, in some examples, maintains a table or other data structure that includes entries corresponding to a port on which a packet is received, a destination address of the packet, and indications of each service to be applied to a packet matching the port and the destination address. In the example of FIG. 1, an entry in such a table specifies that when a packet is received on a particular port with a destination of CE device 24B, PE router 20A is to perform a tunneling service to CE device 24B.

In some examples, PE router 20A includes a dedicated service card, referred to in this disclosure as a "tunnel service unit," to which an inbound packet is directed to determine how to send the packet over a corresponding tunnel, e.g., tunnel 34. That is, in one example, after a router's forwarding plane receives a packet that is destined for a network tunnel, the forwarding plane performs a lookup on the packet and determines that the packet is to be forwarded along a network tunnel. The forwarding plane directs the packet to an internal service plane including the tunnel service unit. The tunnel service unit determines a VRF in which to perform the lookup to select a next hop for the packet, and sends the packet back to a forwarding plane, along with an identifier of the determined VRF. The forwarding plane then performs a route lookup to select the next hop and the output interface for the packet using the VRF determined by the tunnel service unit. In other examples, PE router 20A includes any combination of hardware, software, and/or firmware for determining how to send a packet over a particular tunnel. Such hardware, software, and/or firmware performs similar tasks to those attributed to the tunnel service unit described above, e.g., identifying a VRF in which to perform a lookup of a next hop for the packet.

In some examples, PE router 20A is configured to construct and maintain a plurality of default logical interfaces that may be associated with distinct routing and forwarding tables. PE router 20A constructs certain types of these logical interfaces to provide a default interface for each different instance of a routing table. These default logical interfaces for each routing table are referred to herein as "localhost interfaces." A localhost interface can be viewed as logical (i.e., virtual) interface that is not directly associated with any particular physical interface. Instead, a localhost interface is uniquely associated with a corresponding routing table and may be used to associate general actions with packets being forwarded by that routing table, such as accounting or other actions.

The localhost interface is also referred to as a pseudo-interface. In general, the localhost interface is present and "up" throughout the life of a corresponding routing-instance. That is, the localhost interface is always present for the corresponding routing instance, such that the localhost interface is the first interface to be added when the corresponding routing instance is instantiated and the localhost interface is the last interface to be deleted when the corresponding routing instance is removed. Accordingly, control-plane upheavals that may result due to flap of non-pseudo interfaces (had they been used to disambiguate the routing-instance) is avoided. Localhost interfaces do not "flap," and therefore the use of the localhost interface may provide an advantage over the use of the egress interface to look up a VRF, such that, if the tunnel destination was multi-homed to the PE, and one of the interfaces to the tunnel destination flapped, the tunnel destination route could "move over" from one interface to another, and the "key" for the "VRF to look up" would have to be kept updated from the control plane. This activity of the control plane is not required when the localhost pseudo-interface is used to disambiguate a VRF, since the localhost pseudo-logical interface remains "up" throughout the life of the VRF. In one example, PE router 20A may construct each localhost interface to include, as part of a name or other identifier of the localhost interface, an index of the VRF table or other routing table to which the localhost interface corresponds. According to the techniques described herein, PE router 20A may utilize localhost interfaces to aid selection of the appropriate VRF for forwarding packets and to avoid improper selection and use of the default routing table when admitting packets to a core-facing network tunnel having an egress within a remote customer edge network of a VPN service.

For example, when a packet that is to be tunneled initially arrives at PE router 20A, PE router 20A determines the localhost interface corresponding to the routing instance that includes the tunnel. Therefore, after the packet has been sent to the tunnel service unit, the output interface can be looked up in the VRF table corresponding to the localhost interface.

The configuration of tunneling to a remote CE on a PE router 20A may provide one or more advantages. For example, PE router 20A may enable services to be provided by a service provider to customers even when intermediate devices within the service provider's networks 23 do not support the service. The devices in the service provider network that do not support the service can be tunneled through to reach devices that do in fact provide the service, e.g., CE device 24B. For example, one or more devices that were previously deployed by the service provider within the service provider network may not support multicast, while other service provider devices do support multicast. In this example, the devices that do not support multicast can be tunneled through to reach those devices that support multicast. PE router 20A may also enable tunneling between two VPNs without route leaking or leaking of table next hops to continue lookups. In addition to multicast, the techniques of this disclosure may also be used to tunnel through devices of a service provider network that are not configured to perform various other services and protocols.

Figure 2:
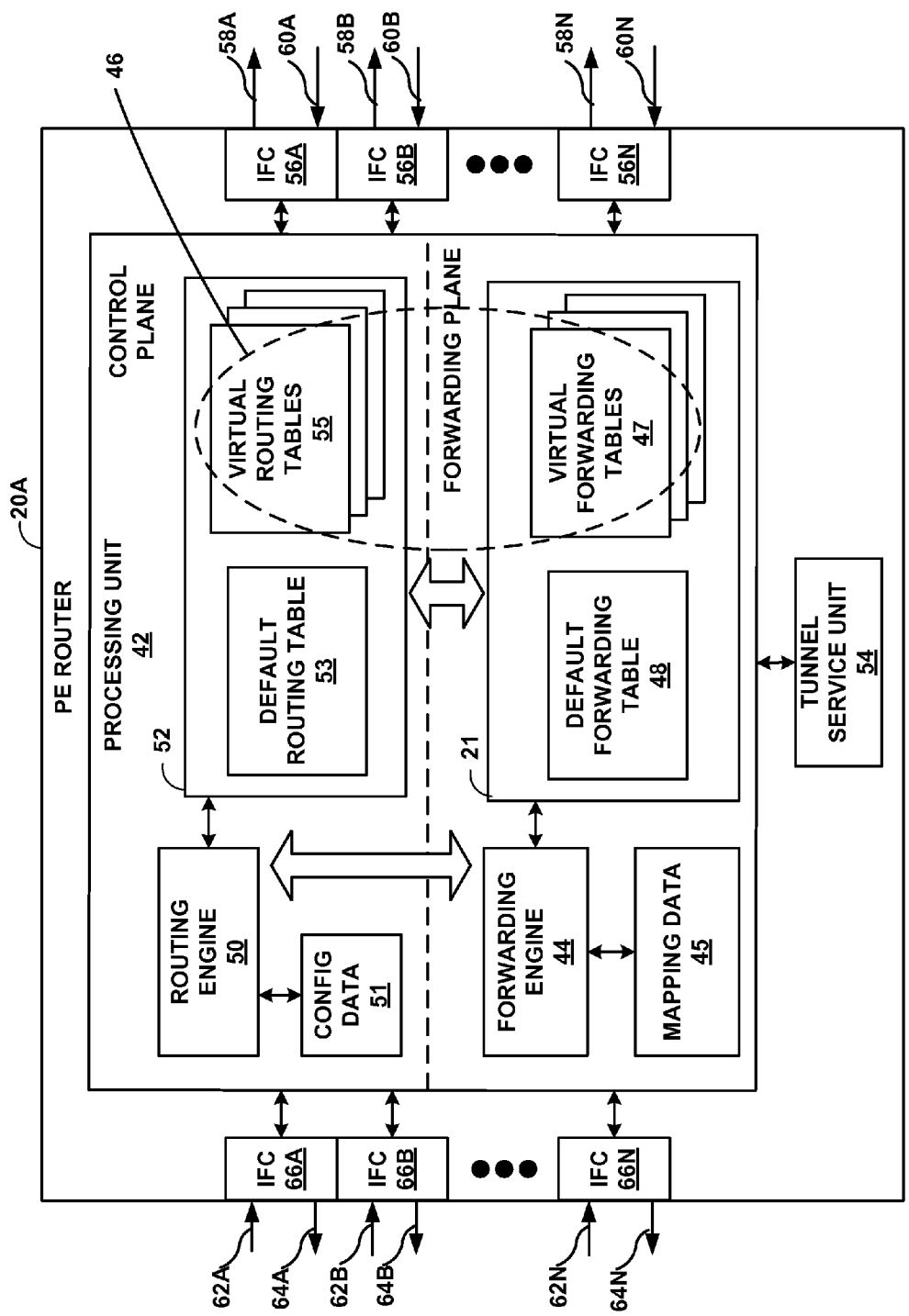
FIG. 2 is a block diagram illustrating an example arrangement of components of a PE router.

FIG. 2 is a block diagram illustrating an example arrangement of components of PE router 20A. Any of CE device 24A, CE device 24B, provider router 22, and PE router 20B of FIG. 1 may also include components similar to those described with respect to PE router 20A of FIG. 2. In the example of FIG. 2, PE router 20A includes customer-facing interface cards 66A-66N (edge IFCs 66) for communicating packets via inbound links 62A-62N ("inbound links 62") and outbound links 64A-64N ("outbound links 64") and core-facing interface cards 56A-56N ("core-facing IFCs 56") for communicating packets via outbound links 58A-58N ("outbound links 58") and inbound links 60A-60N ("inbound links 58"). Core-facing IFCs 56 are coupled to outbound links 58 and inbound links 60, and edge IFCs 66 are coupled to inbound links 62 and outbound links 64, via a number of interface ports (not shown). Each of core-facing IFCs 56 are coupled to a respective network device of intermediate network 26, while each of edge IFCs 66 are coupled to a respective customer edge network device, any or all of which may belong to distinct customers. It should be understood that the letter "N" is used to represent an arbitrary number of devices, and moreover, that the number of IFCs 66 is not necessarily equal to the number of IFCs 56, although the cardinality for both IFCs 56 and IFCs 66 is designated using the variable "N."

PE router 20A also includes processing unit 42. Processing unit 42 includes forwarding engine 44, forwarding information base (FIB) 21, routing engine 50, and routing information base (RIB) 52. Forwarding information base 21 includes default forwarding table 48 and virtual forwarding tables 47, while routing information base 52 includes default routing table 53 and virtual routing tables 55. Together, virtual routing tables 55 and virtual forwarding tables 47 form virtual routing and forwarding (VRF) tables 46, as conceptually indicated by the dashed ellipse circumscribing virtual routing tables 55 and virtual forwarding tables 47. Each of VRF tables 46 includes a distinct one of virtual routing tables 55 and virtual forwarding tables 47. Each of VRF tables 46 corresponds to a particular routing instance. A default routing instance corresponds to default routing table 53 and default forwarding table 48.

Processing unit 42 may be implemented in hardware, software, firmware, or any combination thereof. In one example, instructions for forwarding engine 44 are encoded in a computer-readable storage medium and are executed by a processor of processing unit 42. In other examples, forwarding engine 44 corresponds to a discrete hardware unit, such as a digital signal processor (DSPs), application specific integrated circuit (ASICs), field programmable gate array (FPGAs), or any other equivalent integrated or discrete logic circuitry or combination thereof. Similarly, routing engine 50 comprises any combination of hardware, software, and/or firmware that executes one or more routing protocols to determine routes through a network. Routing engine 50 stores learned and calculated routes in RIB 52, where customer routes for the different VPNs provided by PE router 20A are stored in corresponding virtual routing tables 55 for generation of VPN-specific forwarding information within each of virtual forwarding tables 47. Each of VRF tables 46 associates tunnels to local CE devices with a respective one of edge IFCs 66 and tunnels to remote CE devices with a respective one of core-facing IFCs 56. Default forwarding table 48 associates tunnels to devices of intermediate network 26 with one of core-facing IFCs 56. In this way, different routing instances are used to logically isolate the routing and forwarding information for different VPNs by using VRF tables 46. Each of VRF tables 46 and default forwarding table 48 is associated with a different one of the routing instances and, therefore, a respective localhost interface.

Processing unit 42 also stores configuration (config) data 51 and mapping data 45. Configuration data 51 is typically provided by an administrator to define the configuration data for PE router 20A, including specifying the logical and physical interfaces of IFCs 56, 66. In addition, PE router 20A may generate configuration data 51 to define the set of default logical interfaces associated with each particular routing instances, i.e., the localhost interfaces for the different routing instances. A localhost interface is a logical interface associated with a particular routing instance. In the context of VPNs, processing unit 52 constructs and associates a localhost interface with each routing instance for each VPN, i.e., the corresponding one of virtual routing tables 55 for the VPN and the virtual forwarding table 47 generated therefrom. In accordance with the techniques of this disclosure, a localhost interface is always present for a particular routing interface, because processing unit 42 is configured to automatically generate a localhost interface associated with each of VRF tables 46 as VRF tables 46 are instantiated. Unlike other logical interfaces, a localhost interface is not associated with any physical interface, but is instead associated with a routing instance. In some examples, processing unit 42 generates identifiers associated with the localhost interface that are also related to the corresponding one of VRF tables 46. For example, a name of a localhost interface, in some examples, is enumerated with a numeric identifier that is common to the corresponding one of VRF tables 46.

Each of VRF tables 46 corresponds to a distinct routing instance for a respective VPN. Default routing table 48 also corresponds to a distinct routing instance, referred to as a default routing instance. In general, PE router 20A maintains a separate VRF table 46 for each VPN to which PE router 20A is connected. In accordance with the techniques of this disclosure, PE router 20A performs a route lookup in a specific one of VRF tables 46 to identify a route to a remote CE device, such as remote CE device 24B. That is, this disclosure recognizes that the label for a network tunnel to reach remote CE device 24B would not be found in default routing table 48. Moreover, this disclosure recognizes that in order for a packet to reach remote CE device 24B, the packet must traverse intermediate network 26, and therefore, must be forwarded through one of core-facing IFCs 56. Therefore, to select one of IFCs to reach remote CE device 24B, PE router 20A performs a lookup in one of VRF tables 46 that is associated with a VPN comprising, e.g., CE device 24A and CE device 24B.

In the example of FIG. 2, PE router 20A includes tunnel service unit 54 to assist with tunneling, and in particular, to encapsulate packets to be tunneled with a corresponding label or other header information. In some examples, tunnel service unit 54 comprises a tunnel packet interface card (a "tunnel PIC"). In general, when PE router 20A receives a packet via one of IFCs 66, e.g., IFC 66A, IFC 66A passes the packet to forwarding engine 44, including an indication of a port on which IFC 66A received the packet. Forwarding engine 44 inspects the packet to determine a destination of the packet, e.g., based on header information of the packet that includes an Internet protocol (IP) address of the destination. In some examples, e.g., in which PE router 20A acts as a tunnel egress for a network tunnel between CE device 24A and PE router 20A, PE router 20A sends tunneled packets received from CE device 24A to tunnel service unit 54 for decapsulation, and then looks up a destination of the packet in default forwarding table 48 after receiving the decapsulated packet from tunnel service unit 54. That is, rather than simply decapsulating tunneled packets received from CE device 24A and looking up an output interface for the packets in the forwarding table associated with the egress interface (which could be the core-facing interface, in which case the table would be the default forwarding table, 48), CE device 24A is configured to determine whether the packets are to be further tunneled, and in particular, tunneled to remote CE devices. Forwarding engine 44 determines whether a packet received on the indicated port of IFC 66A (that is, the one of IFCs 66 by which the packet was received) intended for the destination of the packet requires servicing, e.g., tunneling and/or other servicing.

When forwarding engine 44 determines that a packet is to be tunneled, forwarding engine 44 passes the packet to tunnel service unit 54. In general, forwarding engine 44 is configured with mapping data 45 that includes a table or other data structure associated with the one of IFCs 66 that includes indications of inbound packets that require particular services by PE router 20A, such as tunneling services. Mapping data 45 therefore maps particular input interfaces, that is, ones of IFCs 56 and 66, to one of VRFs 46 or default forwarding table 48. In one example, a daemon (e.g., a software routine) executing at the operating system level of PE router 20A uses configuration data 51 to create mapping data 45, such that forwarding engine 44 is able to recognize packets that require tunneling. According to this example, when a packet is received, forwarding engine 44 inspects the received packet, checks mapping data 45 to determine whether tunneling is required for the packet, and selects an appropriate one of VRFs 46 or default forwarding table 48 in which to perform a lookup for the packet. Forwarding engine 44 also performs a lookup for an output interface in the table identified by mapping data 45. For packets that require tunneling, the result of the lookup performed in the table will be tunnel service unit 45. In particular, the result of the lookup is a logical interface to tunnel service unit 45 that is associated with the routing instance (that is, one of VRFs 46 or default forwarding table 48) in which forwarding engine 44 performed the lookup.

Tunnel service unit 54 encapsulates packets to be tunneled with a label or other header corresponding to the tunnel, based on the logical interface by which tunnel service unit 54 received the packet from forwarding engine 44. Moreover, after encapsulating the packet, tunnel service unit 54 also outputs the encapsulated packet to processing unit 42 via the logical interface by which tunnel service unit 54 received the packet from forwarding engine 44. Forwarding engine 44 then receives the encapsulated packet from tunnel service unit 54 via a particular logical interface that is associated with a particular routing instance. Forwarding engine 44 selects one of VRF tables 46 or default forwarding table 48 in which to perform an output interface lookup for the encapsulated packet based on the routing instance associated with the logical interface by which the encapsulated packet was received from tunnel service unit 54.

In general, when the destination of the tunnel for the packet is internal to a provider network, e.g., a device internal to network 26 in the example of FIG. 1, forwarding engine 44 will perform the lookup for the output interface in default forwarding table 48. Default forwarding table 48 includes entries having forwarding information and corresponding next hops for network destinations internal to intermediate network 26. In general, when the destination of the tunnel for the packet is external to the provider network, e.g., a local CE device such as CE device 24A (FIG. 1), forwarding engine 44 will perform the lookup for the output interface in one of VRF tables 46 that particularly corresponds to the tunnel having the CE device as an endpoint. That is, even when a packet is to be forwarded out one of core-facing IFCs 56, forwarding engine 44 performs the lookup to identify the output interface in one of VRF tables 46, rather than default forwarding table 48. In particular, as described in greater detail below with respect to FIGS. 3 and 4, forwarding engine 44 performs the lookup to determine an output interface via which to forward an encapsulated packet in a forwarding table corresponding to a localhost interface that is associated with the routing instance of the logical input interface by which forwarding engine 44 received the encapsulated packet from tunnel service unit 54.

In this manner, PE router 20A is configured to perform lookups for packets of a VPN in a VRF when the packets are to be tunneled to a remote CE device, through the aid of the appropriate localhost logical interface, as mentioned above. Using this model allows packets from the core of intermediate network 26 to be forwarded to a CE device and vice versa, whether the CE device is local or remote. This proves useful when one or more intermediate devices of intermediate network 26 (e.g., PE route 20B) do not implement certain services, such as multicast, and packets need to be tunneled further toward the destination (e.g., customer edge device 24B) to reach a device of intermediate network 26 that implements the services. These techniques also allow tunneling between different VPNs without the use of route leaking or table next hops to continue lookups.

On the encapsulation side (packets being sent out through a tunnel), the tunnel-encapsulated packet is sent to the next hop found as a lookup of the tunnel's destination end-point address, in the routing instance stated as tunnel destination in the tunnel definition part of the configuration. On the decapsulation side (packets being received from the tunnel), the packets are looked up in the routing instance in which the tunnel logical interface is located. In some deployments, there are three modes in which the tunnel is configured: (1) the tunnel logical interface is in the same routing instance as the destination of the tunnel, (2) the tunnel logical interface is in the default routing instance while the tunnel destination is in some VRF, or (3) the tunnel logical interface is in some VRF and the tunnel destination is in the default routing instance. If, however, the tunnel is in VRF A, and uses a different VRF B as the tunnel's destination, then the tunnel can be used to send packets between the two routing instances, as explained above. Such 'cross flow' of traffic between VRFs (or between a VRF and the default instance) comes up in the absence of tunnels as well. There, the usual method is for routing protocols to 'leak' specific prefixes from one table to another, or to follow a table next hop as a 'continuation' of a route lookup to a second, third, or Nth routing instance when the route does not match in the first instance in which it is looked up.

A tunnel is defined using a local end point and a remote end point. The definition of the remote end point may include a routing instance (the absence of a routing instance is implied to mean the default instance).

```
interface gr-0/1/2 {
    unit 0 {
        tunnel {
            source 10.1.1.1;
            destination {
                routing-instance foo;
                60.10.13.11;
            }
        }
        <other attributes of the unit>
    }
}
```

The above configuration states that the tunnel logical interface gr-0/1/2.0 has its source as prefix 10.1.1.1, and its destination is in the routing instance foo at the prefix 60.10.13.11. Similarly, the logical interface itself may be placed in a specific routing instance, as shown by the example of 'foo' above, or some other instance. The absence of an explicit instance-binding implies that the gr-0/1/2.0 interface is in the default instance. Thus, we may have:

routing-instance bar {
interface fe-0/1/0.0;
interface gr-0/1/2.0;
<other attributes of the routing instance>
}

In some examples, processing unit 42 implements the functionality attributed to tunnel service unit 54. That is, in some examples, PE router 20A does not include a separate service card for tunnel service unit 54, but instead includes a hardware unit and/or software module configured to perform the task of selecting an appropriate VRF table in which to lookup an output interface for a tunneled packet. Tunnel service unit 54 is provided in FIG. 2 for purposes of example and explanation.

Figure 3:
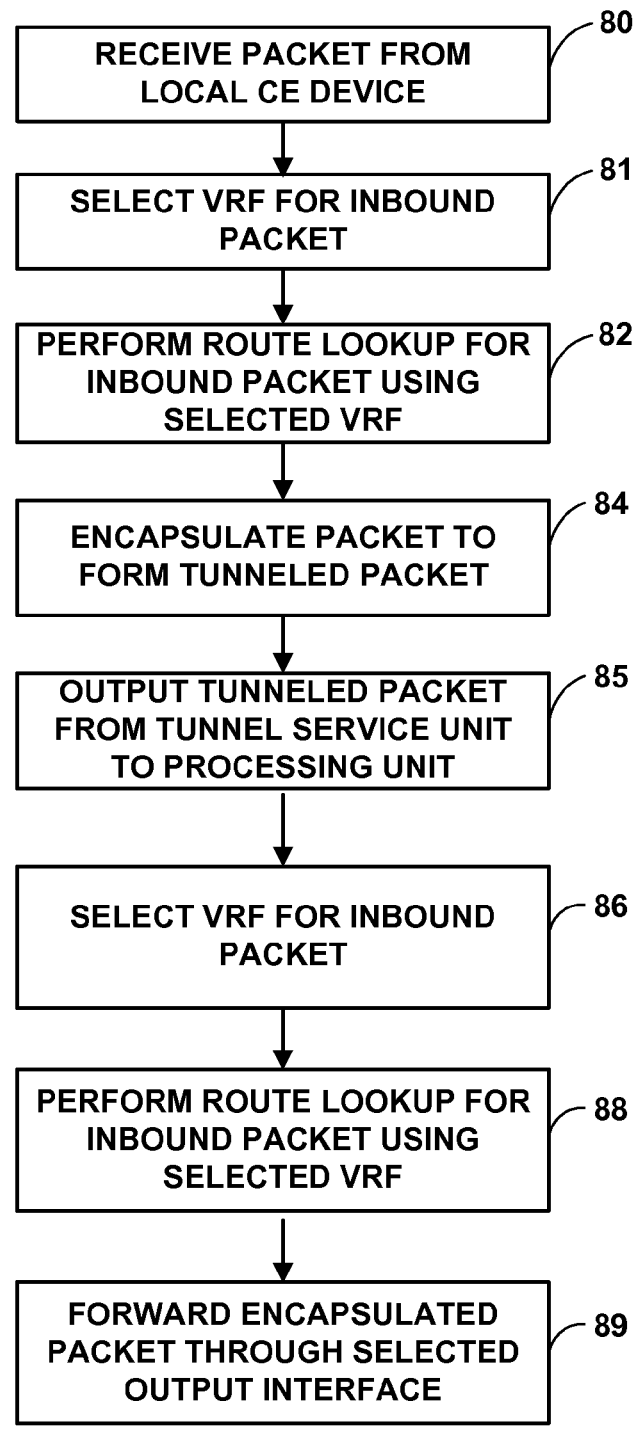
FIG. 3 is a flowchart illustrating an example method for tunneling a packet from a local PE router to a remote CE device.

FIG. 3 is a flowchart illustrating an example method for tunneling a packet from a local PE router to a remote CE device. The method of FIG. 3 is described, for purposes of example, with respect to the network elements of FIG. 1, where PE router 20A tunnels a packet to remote CE device 24B via tunnel 34. However, it should be understood that any general PE router may apply a method similar to that of FIG. 3 to tunnel a packet to a remote CE device. In particular, a PE router of a provider network may use the method of FIG. 3 to tunnel a packet to a CE device that is coupled to a different PE router of the provider network.

In the example of FIG. 3, PE router 20A initially receives a packet from a CE device (80), e.g., from CE device 24A. In particular, the packet initially arrives on a network interface port of one of edge-facing IFCs 66 (FIG. 2), which forwards the packet to processing unit 42 of PE router 20A. At this time, the one of edge IFCs 66 on which the packet arrived also sends to processing unit 42 an indication of the physical port on which the packet arrived.

Processing unit 42 then selects an appropriate one of VRF tables 46 in the forwarding plane using the information identity of the one of IFCs 66 on which the packet arrived, as well as the port on which the packet arrived (81). That is, the appropriate one among the VRF tables 46 is indexable based on the input IFC and network interface on which an inbound packet is received by PE router 20A. After using this information to select the appropriate one of VRF tables 46, forwarding engine 44 performs a first lookup for the packet which, in this case, returns a result that indicates the packet is to be forwarded to a logical tunnel interface associated with tunnel service unit 54 (82). Processing unit 42 performs the lookup by using the destination or other keying information within the packet (e.g., a VLAN tag) as an index in the VRF table, that is, the one of VRF tables 46 for the VPN serviced by the physical port of the receiving one of edge-facing IFCs 66. Processing unit 42 determines that the packet is to be tunneled when the result of the lookup in the selected VRF table indicates that the output interface to which the packet is to be forwarded is a logical tunnel interface assigned to tunnel service unit 54, in one example.

Accordingly, in this example, switching fabric within forwarding engine 44 of processing unit 42 forwards the packet as an outbound packet to tunnel service unit 54 as if the tunnel service unit were an external network destination. Based on the logical tunnel interface on which the packet was received, tunnel service unit 54 forms a tunneled packet by encapsulating the packet with one or more labels and/or headers (84). For example, tunnel service unit 54 may encapsulate the packet with tunnel-related encapsulation (e.g., GRE, IP-IP, IPSEC, or other type of tunnel). Tunnel service unit 54 may also encrypt the contents of tunnel packet for security purposes. After forming the tunneled packet, tunnel service unit 54 sends the encapsulated packet back to processing unit 42 as an inbound packet (85). In this way, tunnel service unit 54 loops the tunneled packet back to processing unit 54 as if the tunneled packet had been received from an external network destination.

Processing unit 42 receives the tunneled packet from tunnel service unit 54 and processes the packet as an inbound packet. Accordingly, forwarding engine 44 selects the one of VRF tables 46 associated with the VPN to be used to perform a lookup of one of core-facing IFCs 56 through which to forward the encapsulated packet (86). As discussed herein, forwarding engine 44 uses default logical interfaces (that is, localhost interfaces) corresponding to each of the forwarding tables (i.e., each of VRFs 46 and default forwarding table 48) to aid selection of the appropriate one of VRF tables. In this way, forwarding engine 44 avoids improper selecting and use of default forwarding table 48 even though the destination of the tunnel is a remote CE device and the output interface for the packet is an output interface associated with one of core-facing IFCs 56. That is, had forwarding engine 44 selected a forwarding information based (FIB) to be applied to the packet based on the output interface to which the packet is to be forwarded, forwarding engine 44 would have selected default forwarding table 48. This selection, however, would have resulted in an error condition in that the tunnel label stack or header information of the encapsulated packet will not be found in default forwarding table 48 but instead is specific to a VPN instance. Further details of using the localhost interfaces to aid this selection process are described with respect to FIG. 5.

Processing unit 42 performs a lookup in the VRF table using the label or header information of the tunneled packet as an index into the VRF table (88) and selects one of core-facing IFCs 56 corresponding to the label of the packet from the VRF table as the output interface. Processing unit 42 forwards the packet out the one of core-facing IFCs 56 selected by performing the lookup in the VRF table (89).

Figure 4A:
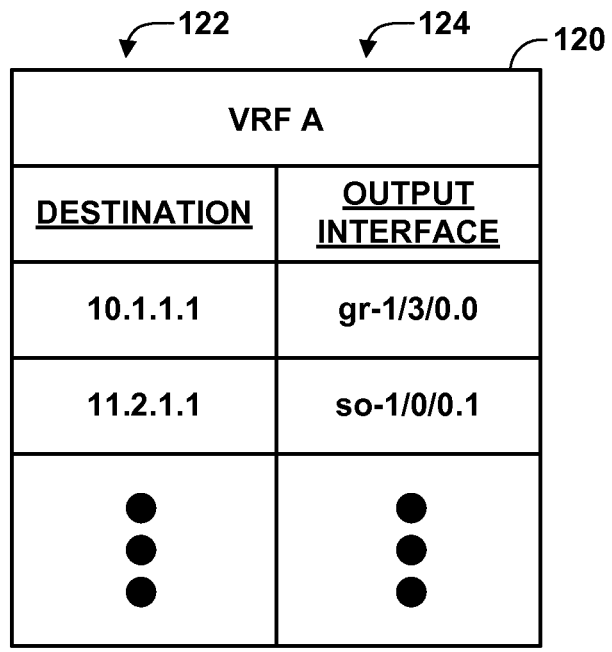
FIGS. 4A and 4B are conceptual diagrams illustrating example VRF tables.
Figure 4B:
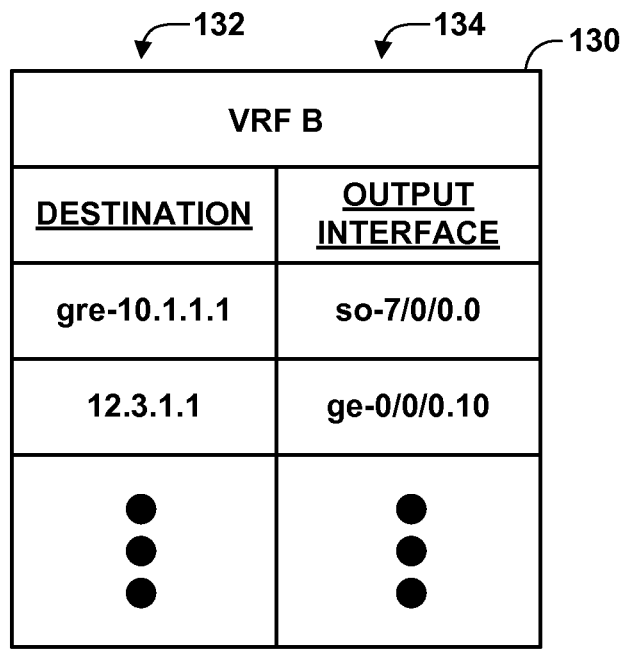

FIGS. 4A and 4B are conceptual diagrams illustrating example VRF tables 120 and 130 that may be used during a two-stage lookup process when a PE router (e.g., PE router 20A) receives a packet from a customer edge device (e.g., CE device 24A) and admits the packet into a tunnel to a remote CE device (e.g., CE device 24B). For example, VRF tables 120 and 130 may be examples of VRF tables 46 of FIG. 2. VRF table 120 of FIG. 4A includes destination column 122 and output interface column 124, while VRF table 130 includes destination column 132 and output interface column 134. As discussed above, forwarding engine 44 uses information from VRF tables 46 to determine an output interface via which to forward a packet, based on the destination of the packet. In particular, the output interface is represented in VRF tables 46 as a logical output interface, which is mapped (by mapping data 45) to physical output interfaces, e.g., one of IFCs 56 or one of IFCs 66. The examples of FIGS. 4A and 4B are directed to examples in which packets received by PE 20A travel from CE 24A to CE 24B, and not in the other direction (e.g., CE 24B to CE 24A), although a tunnel from PE 20A to CE 24A is possible, as discussed above with respect to FIG. 1.

VRF table 120 includes two example entries, represented as rows. The first row of VRF table 120 includes destination "10.1.1.1", which maps to a next hop lookup results of logical output interface defined as "gr-1/3/0.0," which may be assigned as a logical interface of tunnel service unit 54 of unit 0. In the examples of FIGS. 4A and 4B, a logical output interface defined with a prefix "gr" corresponds to a logical output interface that is mapped to tunnel service unit 54, which tunnel service unit 54 will treat as a GRE interface. Accordingly, forwarding engine 44 forwards a packet destined for network address "10.1.1.1," which may be a network address associated with CE device 24B) to tunnel service unit 54. Moreover, tunnel service unit 54 is aware of the logical interface by which a packet was received, and therefore, can determine a VPN that corresponds to the packet. In this manner, tunnel service unit 54 can determine a header with which to encapsulate a packet.

The second row of VRF table 120 includes destination "11.2.1.1", which produces a next hop lookup result of a logical output interface defined as "so-1/0/0.1." The "so" prefix in this example indicates that the logical output interface corresponds to a SONET interface of unit 1. Mapping data 51 maps the logical interface "so-1/0/0.1" to a particular one of IFCs 56 or one of IFCs 66.

VRF table 130 also includes two example entries. The first row of VRF table 130 includes destination "gre-10.1.1.1", which produces a next hop lookup result of a logical output interface defined as "so-7/0/0.0." The destination indicator "gre-10.1.1.1" in the example of FIG. 4 corresponds to a GRE header which may be associated with tunnel 34. For purposes of example, it is assumed that "gre-10.1.1.1" is the header the tunnel service unit 54 uses to encapsulate a packet received from forwarding engine 44 associated with logical interface "gr-1/3/0.0." When forwarding engine 44 receives a packet encapsulated with label "gre-10.1.1.1," forwarding engine 44 refers to VRF 130 and forwards the packet via logical output interface "so-7/0/0.0," which is a logical interface that is mapped by mapping data 45 to one of IFCs 56 or one of IFCs 66 for forwarding packets along a core-facing sonet interface to provider router 22. As another example, the second row of VRF 130 includes destination "12.3.1.1," which results in next hop lookup result of logical interface "ge-0/0/0.10," which may be a logical interface associated with a gigabit Ethernet interface of unit 10.

Figure 5:
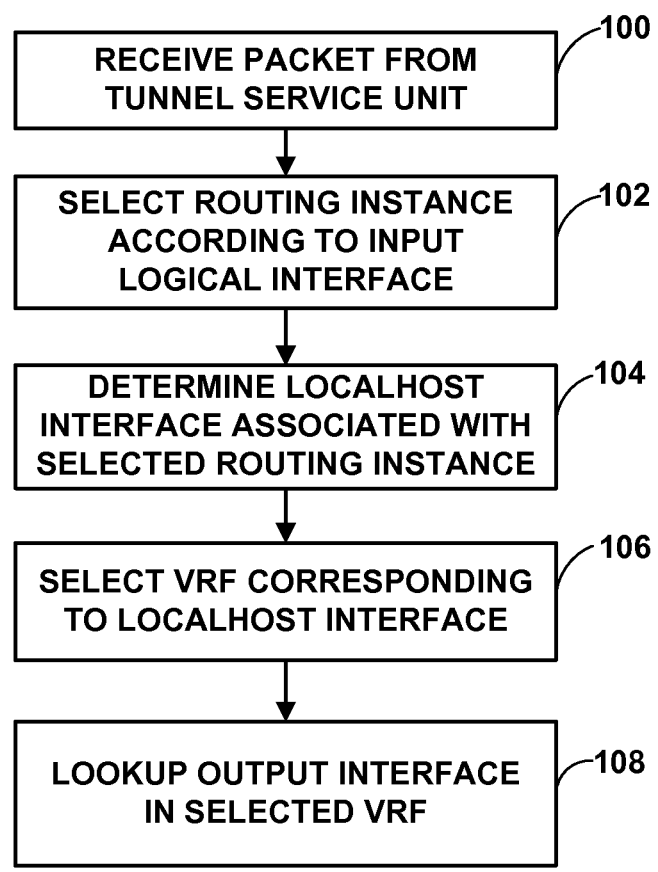
FIG. 5 is a flowchart illustrating an example method for determining one of a plurality of virtual routing and forwarding tables in which to lookup an output interface for a received packet.

FIG. 5 is a flowchart illustrating in more detail an example technique by which processing unit 42 selects one of VRF tables 46 in which to lookup an output interface for a tunneled packet received from tunnel service unit 52. That is, FIG. 5 is a flowchart illustrating in more detail an example technique for implementing step 86 of the flowchart of FIG. 3.

Initially, forwarding engine 44 receives a packet from a logical interface associated with tunnel service unit 54 (100). In one example, tunnel service unit 54 is represented by a single physical interface. One or more logical interfaces, each corresponding to different VPN routing instances, may be associated with tunnel service unit 54. In this manner, in this example it is assumed that the packet was previously output to tunnel service unit 54 for encapsulation, e.g., as discussed above with respect to FIG. 3 and step 85. It is further assumed, with respect to the example of FIG. 5, that tunnel service unit 54 encapsulates the packet with one or more headers corresponding to the appropriate tunnel and loops the encapsulated packet to forwarding engine 44 as an inbound packet.

Upon receiving the packet, forwarding engine 44 determines a routing instance associated with the received packet based on the logical interface by which the packet is received from tunnel service unit 54 (102). That is, configuration data 51 describes associations between logical interfaces and routing instances. As described above with respect to FIG. 2, routing engine 50 pushes certain parts of configuration data 51 to the forwarding plane of processing unit 42. In particular, certain parts of configuration data 51 are stored as mapping data 45 in the forwarding plane. Mapping data 45 includes a mapping between logical interfaces and routing instances. Accordingly, based on the logical interface on which forwarding engine 44 receives the packet from tunnel service unit 55, forwarding engine 44 determines the routing instance associated with the packet, i.e., the routing instance for which the tunneling information is present. For example, forwarding engine 44 may examine mapping data 45 to determine which routing instance corresponds to the input logical interface by which the packet was received from tunnel service unit 54.

Next, forwarding engine 44 selects the proper VRF (specifically, the proper virtual forwarding table 47) to be used forwarding the packet given that the egress of the tunnel may fall within a customer VPN (e.g., customer edge device 24B). In one example, forwarding engine 44 uses a selection technique which allows forwarding table selection to be based on an interface identifier even though the outbound physical interface for the tunneled packet may ultimately be a core-facing interface that is not associated with the customer VPN. For example, forwarding engine 44 first determines a localhost interface associated with the identified routing instance (104). Forwarding engine 44 refers to mapping data 45 to determine which localhost interface was originally constructed for and corresponds to the selected VPN routing instance. Then, using an identifier the localhost interface instead of any physical interface, forwarding engine 44 selects one of VRF tables 46 in which to perform a lookup of an output interface for the packet (106). As discussed above, each one of VRF tables 46 is associated with a localhost interface. The association, in some examples, is described by labels or names associated with each localhost interface, where the labels include commonly enumerated values for an identifier of the localhost interface and an identifier for the one of VRF tables 46. For example, assuming that the localhost interface is assigned an identifier such as "localhost__37," a corresponding one of VRF tables 46 may include an identifier such as "VRF__37" where "37" represents the routing instance for the VPN Upon selecting one of VRF tables 46 using the localhost interface, forwarding engine 44 performs a lookup to identify the output interface through which to forward the packet in the selected one of VRF tables 46 (108), as described in FIG. 3 with respect to step 88.

As noted above, the output interface for a packet to be tunneled to a remote CE device can be selected from a VRF table associated with a localhost interface. In some examples, the output interface for a tunneled packet can be selected from a VRF table (or a default forwarding table) as indicated by the localhost interface, regardless of whether the destination of the tunnel is internal to a provider network, a local CE device, or a remote CE device. For a network tunnel from a PE router to another router within the same provider network, the corresponding localhost interface is associated with the default routing instance. For a network tunnel from a PE router to a local CE device, the localhost interface would be the localhost interface associated with the VPN of the local CE device. For a network tunnel from a PE router to a remote CE device, the localhost interface would be the localhost interface associated with the VPN of the remote CE device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A processing unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
   receiving a packet with a provider edge routing device comprising a default forwarding table for a core network and a plurality of virtual routing and forwarding (VRF) tables for respective customer virtual private networks separated by the core network, wherein each of the VRF tables is associated with a respective default logical interface of a plurality of default logical interfaces, and wherein the default logical interfaces are not associated with any physical network interface of the provider edge routing device;
   determining, with the provider edge routing device, whether the packet was received from one of the default logical interfaces;
   in response to determining that the packet was received by one of the default logical interfaces:
      selecting one of the plurality of VRF tables in which to perform an output interface lookup for the packet that corresponds to the default logical interface by which the packet was received, wherein each of the plurality of VRF tables is associated with a respective customer-facing physical interface; and
      determining an output interface from the one of the plurality of VRF tables based on a destination of the packet, wherein the determined output interface comprises a core-facing physical output interface;
   in response to determining that the packet was not received by one of the default logical interfaces, determining the output interface from the default forwarding table based on the destination of the packet; and
   forwarding the packet via the determined output interface.

2. The method of claim 1, further comprising:
   instantiating the one of the plurality of VRF tables prior to selecting the one of the plurality of VRF tables;
   automatically creating the logical interface at the time of instantiating the one of the plurality of VRF tables; and
   associating the logical interface with the one of the plurality of VRF tables.

3. The method of claim 1, wherein the packet comprises an encapsulated packet, the method further comprising:
   receiving a packet via a network interface; and
   forwarding the packet to a tunnel service unit of the provider edge routing device to cause the tunnel service unit to encapsulate the packet,
   wherein receiving the encapsulated packet comprises receiving the encapsulated packet from the tunnel service unit.

4. The method of claim 3,
   wherein forwarding the packet to the tunnel service unit comprises forwarding the packet to the tunnel service unit via a logical interface associated with the tunnel service unit,
   wherein receiving the encapsulated packet comprises receiving the encapsulated packet via the logical interface associated with the tunnel service unit,
   the method further comprising using the logical interface associated with the tunnel service unit to identify the logical interface that is not associated with a physical output interface.

5. The method of claim 4, wherein determining the output interface from the one of the plurality of VRF tables based on the destination of the packet comprises:
   determining that the destination of the packet comprises a remote customer edge network device based on a label with which the packet is encapsulated;
   performing a lookup in the one of the plurality of VRF tables based on the label; and
   determining the output interface as an output interface identified by the one of the plurality of VRF tables corresponding to the label.

6. The method of claim 1, wherein the logical interface comprises a localhost interface having an identifier that corresponds to an identifier of the one of the plurality of VRF tables, wherein the localhost interface is always present for the corresponding routing instance, such that the localhost interface is the first interface to be added when the corresponding routing instance is instantiated and the localhost interface is the last interface to be deleted when the corresponding routing instance is removed.

7. A routing device comprising:
   a plurality of physical network interfaces comprising one or more customer-facing physical interfaces and one or more core-facing physical output interfaces;
   a processing unit comprising:
      a default forwarding table for a core network;
      a plurality of virtual routing and forwarding (VRF) tables that store forwarding information for different corresponding customer virtual private networks (VPNs) separated by the core network, wherein each of the plurality of VRF tables is associated with a respective one of the customer-facing physical interfaces;
      a plurality of logical interfaces, each of the logical interfaces corresponding to a different one of the plurality of VRF tables, wherein each of the logical interfaces is a default logical interface for the corresponding VRF table and is not associated with any of the physical network interfaces, and
   wherein, to perform an output interface lookup for a packet, the processing unit:
      determines whether the packet was received from one of the default logical interfaces;
      in response to determining that the packet was received by one of the default logical interfaces:

selects one of the plurality of VRF tables that corresponds to the default logical interface by which the packet was received; and selects one of the core-facing physical output interfaces from the selected one of the plurality of VRF tables based on a destination of the packet, in response to determining that the packet was not received by one of the default logical interfaces, selects one of the core-facing physical output interfaces from the default forwarding table based on the destination of the packet, and wherein, in accordance with the output interface lookup, the processing unit outputs the packet to the selected one of the core-facing physical output interfaces.

8. The routing device of claim 7, wherein the output interface lookup results in a determination of the physical network interface with which to output the packet based on a destination specified within the packet.

9. The routing device of claim 7, further comprising:
a routing engine that executes a plurality of different routing instances, each of the routing instances corresponding to a different one of the VRF tables; and
a forwarding engine that selects one of the logical interfaces based on the one of the routing instances to which the packet corresponds and to select the one of the plurality of VRF tables using the selected logical interface.

10. The routing device of claim 7, wherein the processing unit instantiates the one of the plurality of VRF tables prior to selecting the one of the plurality of VRF tables, automatically creates the logical interface at the time of instantiating the one of the plurality of VRF tables, and associates the logical interface with the one of the plurality of VRF tables.

11. The routing device of claim 7, wherein the packet comprises an encapsulated packet, the routing device further comprising a tunnel service unit that encapsulates packets, wherein the processing unit receives a packet via a second one of the plurality of network interfaces, forwards the packet to the tunnel service unit to cause the tunnel service unit to encapsulate the packet, and receives the encapsulated packet from the tunnel service unit.

12. The routing device of claim 11, wherein to forward the packet to the tunnel service unit, the processing unit forwards the packet to the tunnel service unit via a logical interface associated with the tunnel service unit, wherein to receive the encapsulated packet, the processing unit receives the encapsulated packet via the logical interface associated with the tunnel service unit, and wherein the processing unit uses the logical interface associated with the tunnel service unit to identify the logical interface that is not associated with a physical output interface.

13. The routing device of claim 12, wherein to determine the output interface from the one of the plurality of VRF tables based on the destination of the packet, the processing unit determines that the destination of the packet comprises a remote customer edge network device based on a label with which the packet is encapsulated, performs a lookup in the one of the plurality of VRF tables based on the label, and determines the output interface as an output interface identified by the one of the plurality of VRF tables corresponding to the label.

14. The routing device of claim 7, wherein the logical interface comprises a localhost interface that includes an identifier that corresponds to an identifier of the one of the plurality of VRF tables, wherein the localhost interface is always present for the corresponding routing instance, such that the localhost interface is the first interface to be added when the corresponding routing instance is instantiated and the localhost interface is the last interface to be deleted when the corresponding routing instance is removed.

15. A system comprising:
a network device of a virtual private network; and
a provider edge routing device comprising:
a plurality of physical network interfaces comprising one or more customer-facing physical interfaces and one or more core-facing physical output interfaces;
a processing unit comprising:
a default forwarding table for a core network;
a plurality of virtual routing and forwarding (VRF) tables that store forwarding information for different corresponding customer virtual private networks (VPNs), including the virtual private network for the network device, that are separated by the core network, wherein each of the plurality of VRF tables is associated with a respective one of the customer-facing physical interfaces;
a plurality of logical interfaces, each of the logical interfaces corresponding to a different one of the plurality of VRF tables, wherein each of the logical interfaces is a default logical interface for the corresponding VRF table and is not associated with any of the physical network interfaces, and
wherein, to perform an output interface lookup for a packet, the processing unit:
determines whether the packet was received from one of the default logical interfaces;
in response to determining that the packet was received by one of the default logical interfaces:
selects one of the plurality of VRF tables that corresponds to the default logical interface by which the packet was received; and
selects one of the core-facing physical output interfaces from the selected one of the plurality of VRF tables based on a destination of the packet,
in response to determining that the packet was not received by one of the default logical interfaces, selects one of the core-facing physical output interfaces from the default forwarding table based on the destination of the packet, and
wherein, in accordance with the output interface lookup, the processing unit outputs the packet to the selected one of the core-facing physical output interfaces.

16. The system of claim 15, wherein the output interface lookup results in a determination of the physical network interface with which to output the packet based on a destination specified within the packet.

17. The system of claim 15, wherein the provider edge routing device further comprises:
a routing engine that executes a plurality of different routing instances, each of the routing instances corresponding to a different one of the VRF tables, and
a forwarding engine that selects one of the logical interfaces based on the one of the routing instances to which the packet corresponds and to select the one of the plurality of VRF tables using the selected logical interface.

18. The system of claim 15, wherein the processing unit instantiates the one of the plurality of VRF tables prior to selecting the one of the plurality of VRF tables, automatically creates the logical interface at the time of instantiating the one of the plurality of VRF tables, and associates associate the logical interface with the one of the plurality of VRF tables.

19. The system of claim 15, wherein the packet comprises an encapsulated packet, the routing device further comprising a tunnel service unit that encapsulates packets, wherein the processing unit receives a packet via a second one of the plurality of network interfaces, forwards the packet to the tunnel service unit to cause the tunnel service unit to encapsulate the packet, and receives the encapsulated packet from the tunnel service unit.

20. The system of claim 19, wherein to forward the packet to the tunnel service unit, the processing unit forwards the packet to the tunnel service unit via a logical interface associated with the tunnel service unit, wherein to receive the encapsulated packet, the processing unit receives the encapsulated packet via the logical interface associated with the tunnel service unit, and wherein the processing unit uses the logical interface associated with the tunnel service unit to identify the logical interface that is not associated with a physical output interface.

21. The system of claim 20, wherein the network device of the virtual private network comprises a remote customer edge network device, wherein to determine the output interface from the one of the plurality of VRF tables based on the destination of the packet, the processing unit determines that the destination of the packet comprises a remote customer edge network device based on a label with which the packet is encapsulated, performs a lookup in the one of the plurality of VRF tables based on the label, and determines the output interface as an output interface identified by the one of the plurality of VRF tables corresponding to the label.

22. The system of claim 15, wherein the logical interface comprises a localhost interface that includes an identifier that corresponds to an identifier of the one of the plurality of VRF tables, wherein the localhost interface is always present for the corresponding routing instance, such that the localhost interface is the first interface to be added when the corresponding routing instance is instantiated and the localhost interface is the last interface to be deleted when the corresponding routing instance is removed.

23. A non-transitory computer-readable storage medium encoded with instructions for causing a programmable processor of a provider edge routing device comprising a default forwarding table for a core network and a plurality of virtual routing and forwarding (VRF) tables for respective customer virtual private networks separated by the core network to:
  receive a packet with a provider edge routing device comprising a default forwarding table for a core network and a plurality of virtual routing and forwarding (VRF) tables for respective customer virtual private networks separated by the core network, wherein each of the VRF tables is associated with a respective default logical interface of a plurality of default logical interfaces, and wherein the default logical interfaces are not associated with any physical network interface of the provider edge routing device;
  determine whether the packet was received from one of the default logical interfaces;
  in response to determining that the packet was received by one of the default logical interfaces:
    select one of the plurality of VRF tables in which to perform an output interface lookup for the packet that corresponds to the default logical interface by which the packet was received, wherein each of the plurality of VRF tables is associated with a respective customer-facing physical interface; and
    determine an output interface from the one of the plurality of VRF tables based on a destination of the packet, wherein the determined output interface comprises a core-facing physical output interface;
  in response to determining that the packet was not received by one of the default logical interfaces, determine the output interface from the default forwarding table based on the destination of the packet; and
  forward the packet via the determined output interface.

24. The non-transitory computer-readable storage medium of claim 23, further comprising instructions to:
  instantiate the one of the plurality of VRF tables prior to selecting the one of the plurality of VRF tables;
  automatically create the logical interface at the time of instantiating the one of the plurality of VRF tables; and
  associate the logical interface with the one of the plurality of VRF tables.

25. The non-transitory computer-readable storage medium of claim 23, wherein the packet comprises an encapsulated packet, the computer-readable storage medium further comprising instructions to:
  receive a packet via a network interface; and
  forward the packet to a tunnel service unit of the provider edge routing device to cause the tunnel service unit to encapsulate the packet,
  wherein the instructions that cause the processor to receive the encapsulated packet comprise instructions that cause the processor to receive the encapsulated packet from the tunnel service unit.

26. The non-transitory computer-readable storage medium of claim 25,
  wherein the instructions to forward the packet to the tunnel service unit comprise instructions to forward the packet to the tunnel service unit via a logical interface associated with the tunnel service unit,
  wherein the instructions to receive the encapsulated packet comprise instructions to receive the encapsulated packet via the logical interface associated with the tunnel service unit,
  the computer-readable storage medium further comprising instructions to use the logical interface associated with the tunnel service unit to identify the logical interface that is not associated with a physical output interface.

27. The non-transitory computer-readable storage medium of claim 26, wherein the instructions to determine the output interface from the one of the plurality of VRF tables based on the destination of the packet comprise instructions to:
  determine that the destination of the packet comprises a remote customer edge network device based on a label with which the packet is encapsulated;
  perform a lookup in the one of the plurality of VRF tables based on the label; and
  determine the output interface as an output interface identified by the one of the plurality of VRF tables corresponding to the label.

28. The non-transitory computer-readable storage medium of claim 23, wherein the logical interface comprises a localhost interface that includes an identifier that corresponds to an identifier of the one of the plurality of VRF tables, wherein the localhost interface is always present for the corresponding routing instance, such that the localhost interface is the first interface to be added when the corresponding routing instance is instantiated and the localhost interface is the last interface to be deleted when the corresponding routing instance is removed.

* * * * *